Oct. 17, 1939.  E. H. HORST  2,176,135
DUSTPAN
Filed Feb. 11, 1938
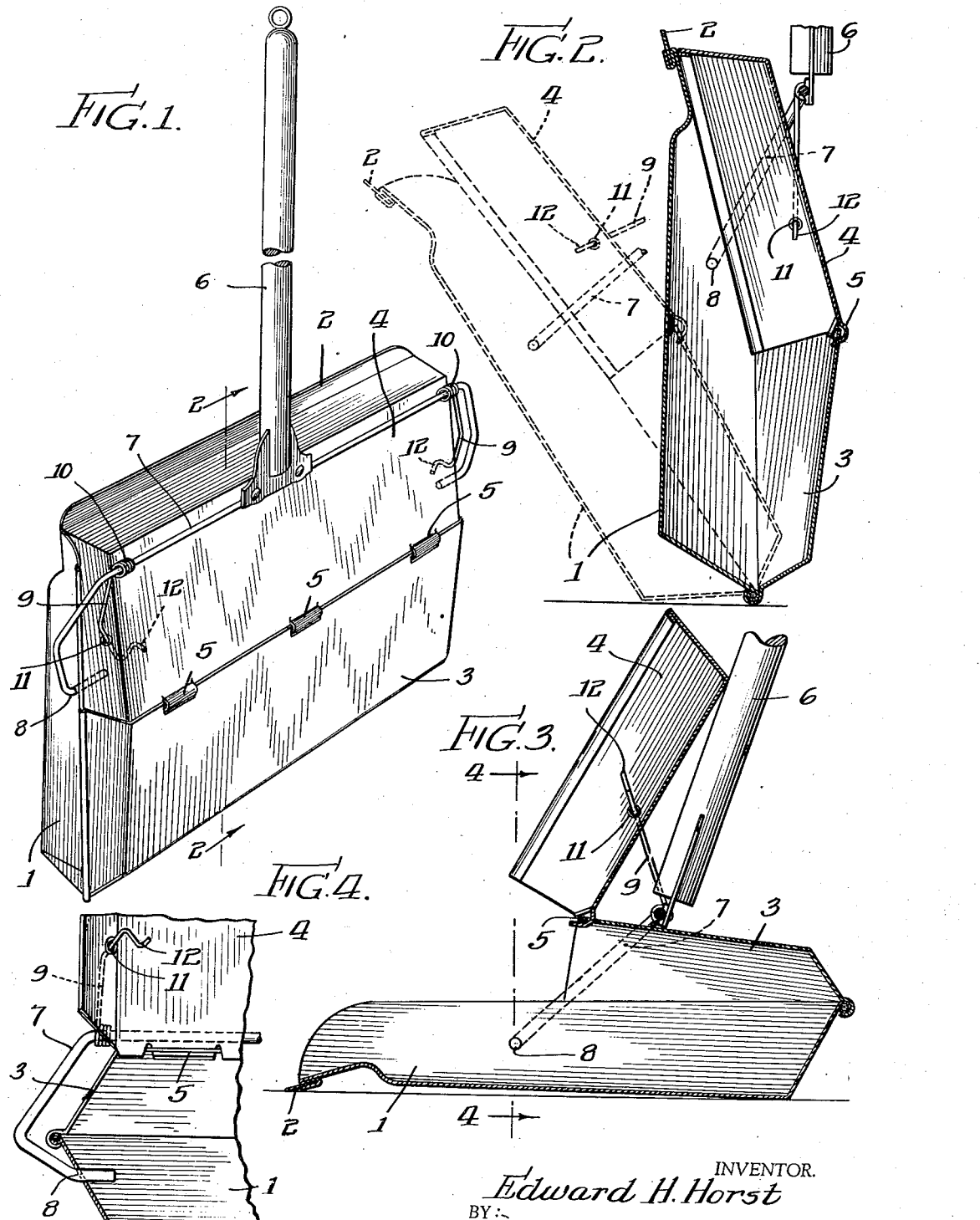
INVENTOR.
Edward H. Horst
BY
Arthur F. Durand
ATTORNEY.

Patented Oct. 17, 1939

2,176,135

UNITED STATES PATENT OFFICE 2,176,135

DUSTPAN

Edward H. Horst, Clinton, Iowa, assignor to Patent Novelty Company, Fulton, Ill., a corporation of Illinois Application February 11, 1938, Serial No. 190,071

5 Claims. (Cl. 65—20)

This invention relates to dust pans of the kind that have a handle for moving the pan along the floor, in gathering up dust and dirt, and for opening and closing the cover of the pan, so that the cover is open when the pan is on the floor, but closed when lifted off the latter.

Generally stated, the object of the invention is to provide a novel and improved construction and arrangement whereby the said cover is automatically controlled by a simple connection with the yoke of the handle, so that the cover is closed by and against the yoke when the pan is lifted and carried around, and whereby the cover is opened by the yoke when the pan is placed on the floor for use.

It is also an object to provide certain details and novel features of construction tending to increase the general efficiency and desirability of a dust pan of this particular character.

To the foregoing and other useful ends, the invention consists in matters hereinafter set forth and claimed, and shown in the accompanying drawing, in which:

Fig. 1 is a perspective of a dust pan involving the principles of the invention, showing the same lifted off the floor.

Fig. 2 is a vertical section on line 2—2 in Fig. 1 of the drawing, on a larger scale, with the pan and its cover shown in dotted lines in an inclined position thereof.

Fig. 3 is a view similar to Fig. 2, but showing the pan resting flatwise on the floor, with the cover in open position.

Fig. 4 is a detail fragmentary section on line 4—4 in Fig. 3 of the drawing.

As thus illustrated, the pan body 1 is open at its front edge 2 and closed at its rear by the fixed hood 3, and is preferably made of sheet metal. The cover 4 is hinged to the front edge of the hood 3 at 5, and when closed rests upon the front edge 2 of the body.

A handle 6 has a wire bail or yoke 7 that is pivoted on the sides of the body at 8, and that has side links 9, of wire, hinged on the yoke at 10 and pivoted at 11 on the side of the cover. These links 9 also have sliding motion in the openings at 11, the inner ends 12 of these links being bent to prevent them from pulling out through said openings.

Thus, when the handle 6 is in the position shown in Fig. 1, the pan hangs down with the cover 4 closed and against the yoke 7, to carry the contents in the rear portion of the body. However, when the pan is on the floor, as shown in Fig. 3, the cover 4 is open and against the handle 6, and dust and dirt may be swept into the front of the pan body. But when lifted off the floor, the pan then assumes the closed condition shown in Fig. 1 of the drawing.

With the cover in closed position, it will be seen that all of the pivotal points 8 and 11 are forward of the hinge connections 5 between the cover and the hood. When the cover is raised, the pivotal points 8 are still forward of the said hinge connections 5, but the pivotal points 11 are then in rear thereof.

With the construction shown and described, it will be seen that the handle 6 is against the cover 4, and that the bail 7 is down against the top of the body 3, when the latter is on the floor and the handle is swung back as far as possible. When the body 3 is horizontal, and the cover 4 is closed, it will be seen that the pivotal points 8 and 11 are also forward of the hinge 5 between the cover and the body. The same thing stated another way is that in Fig. 2 the pivotal points 8 and 11 are above the hinge 5 between the body and cover, this being the position of the parts when the device is lifted off the floor.

What I claim as my invention is:

1. In a dust pan, a pan body having a covered rear end and an open front end, a handle pivoted by a yoke on said body, so that the later will hang with its front end up and its rear end down, when raised from the floor, a front cover hinged on said body, and a pivotal connection between said yoke and said cover, whereby the later is closed when the pan is suspended by its handle, and is open when the pan is in operative horizontal position on the floor, said pivotal connection comprising side links that slide endwise in their pivotal points on the cover.

2. A structure as specified in claim 1, said links having bent ends at said pivotal points, and having their other ends coiled around the transverse portion of said yoke.

3. A structure as specified in claim 1, the cover resting against the handle and the bail on the body when the latter is flat on the floor and the handle back as far as it can swing.

4. In a dust pan, a pan body having a covered rear end and an open front end, a handle pivoted by a yoke on said body, so that the latter will hang with its front end up and its rear end down, when suspended by its handle, a front cover hinged on said body, and a pivotal connection between said yoke and said cover, whereby the latter is closed when the pan is suspended by its handle, and is open when the pan is in operative horizontal position on the floor, the cover being against the handle and the bail on the body when the latter is on the floor and the handle is as far back as it can swing, said pivotal connection comprising side links hinged on the yoke and pivoted on the cover, so that the yoke engages and keeps the cover closed when the pan is suspended by its handle.

5. In a dust pan, a pan body having a covered rear end and an open front end, a handle pivoted by a yoke on said body, so that the latter will hang with its front end up and its rear end down, when suspended by its handle, a front cover hinged on said body, and a pivotal connection between said yoke and said cover, whereby the latter is closed when the pan is suspended by its handle, and is open when the pan is in operative horizontal position on the floor, the cover being against the handle and the bail on the body when the latter is on the floor and the handle is as far back as it can swing, all of the pivotal points on the body and cover being forward of the cover hinge, when the body is horizontal and the cover is closed.

EDWARD H. HORST.